(12) United States Patent
Kim et al.

(10) Patent No.: US 8,012,635 B2
(45) Date of Patent: Sep. 6, 2011

(54) FUEL REFORMING APPARATUS AND FUEL CELL SYSTEM WITH THE SAME

(75) Inventors: Ju-Yong Kim, Suwon-si (KR); Chan-Ho Lee, Suwon-si (KR); Sung-Chul Lee, Suwon-si (KR); Dong-Myung Suh, Suwon-si (KR); Jin-Kwang Kim, Suwon-si (KR); Jin-Goo Ahn, Suwon-si (KR); Dong-Uk Lee, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 1302 days.

(21) Appl. No.: 11/543,251

(22) Filed: Oct. 5, 2006

(65) Prior Publication Data
US 2007/0082237 A1    Apr. 12, 2007

(30) Foreign Application Priority Data
Oct. 6, 2005   (KR) .................. 10-2005-0093818

(51) Int. Cl.
*H01M 8/06* (2006.01)
*B01J 19/00* (2006.01)

(52) U.S. Cl. .................. 429/423; 429/408; 422/198
(58) Field of Classification Search .......... None
See application file for complete search history.

(56) References Cited

U.S. PATENT DOCUMENTS

| | | | |
|---|---|---|---|
| 7,063,047 | B2 | 6/2006 | Reinke et al. |
| 7,070,633 | B2 * | 7/2006 | Okada et al. .................. 48/61 |
| 2004/0247960 | A1 | 12/2004 | Sato et al. |
| 2005/0287409 | A1 * | 12/2005 | Reinke et al. .................. 429/26 |
| 2006/0006108 | A1 * | 1/2006 | Arias et al. .................. 210/232 |
| 2007/0190380 | A1 * | 8/2007 | DeVries .................. 429/24 |
| 2008/0160362 | A1 * | 7/2008 | Kadowaki et al. .................. 429/17 |

FOREIGN PATENT DOCUMENTS

| | | |
|---|---|---|
| JP | 2002-348101 | 12/2002 |
| JP | 2003-238109 | 8/2003 |
| JP | 2004-018275 | 1/2004 |
| JP | 2004-149407 | 5/2004 |
| JP | 2004-175630 | 6/2004 |
| JP | 2005-056636 | * 3/2005 |

* cited by examiner

*Primary Examiner* — Barbara L. Gilliam
*Assistant Examiner* — Angela J. Martin
(74) *Attorney, Agent, or Firm* — Robert E. Bushnell, Esq.

(57) ABSTRACT

A fuel reforming apparatus which generates a reformed gas containing hydrogen by reforming a fuel and supplies the reformed gas to a fuel cell body is provided. The fuel reforming apparatus is constructed with a burner which generates a flame by burning the fuel together with the atmospheric air, a reforming reactor which receives thermal energy of the flame and generates the reformed gas through a reforming reaction between the fuel and steam, an evaporator in which a pipeline for allowing the fuel and water to flow is disposed in the direction of the flame sprayed from the burner, with the water being evaporated by using the flame and the fuel and steam being supplied to the reforming reactor, and a spraying unit which is disposed in a direction of the sprayed flame to spray additional air into the evaporator.

10 Claims, 5 Drawing Sheets

FUEL REFORMING APPARATUS AND FUEL CELL SYSTEM WITH THE SAME

CLAIM OF PRIORITY

This application makes reference to, incorporates the same herein, and claims all benefits accruing under 35 U.S.C. §119 from an application for APPARATUS FOR REFORMING FUEL AND FUEL CELL SYSTEM WITH THE SAME earlier filed in the Korean Intellectual Property Office on the 6 Oct. 2005 and there duly assigned Serial No. 10-2005-0093818.

BACKGROUND OF THE INVENTION

1. Field of the Invention

The present invention relates to a fuel cell generally, and more particularly, to a fuel reforming apparatus of a fuel cell system.

2. Description of the Related Art

As is known, a fuel cell is constructed as a system for generating electrical energy using a fuel.

In the fuel cell, a polymer electrolyte membrane fuel cell has an excellent output characteristic, a low operating temperature, and fast starting and response characteristics. In addition, the polymer electrolyte fuel cell advantageously has a wide range of applications including a mobile power source for vehicles, a distributed power source for homes or buildings, and a small-sized power source for electronic apparatuses.

A fuel cell system incorporating the polymer electrolyte membrane fuel cell is typically constructed with a fuel cell body which is referred to as a stack (hereinafter, for convenience, referred to as "stack"), a fuel reforming apparatus which reforms the fuel to generate a reformed gas containing hydrogen and supplies the reformed gas to the fuel cell body, and an oxidant gas supply unit which supplies an oxidant gas to the stack.

Therefore, the polymer electrolyte membrane fuel cell system generates electrical energy through an electro-chemical reaction between the reformed gas supplied from the fuel reforming apparatus in the stack and the oxidant gas supplied from the oxidant gas supply unit.

The fuel reforming apparatus is constructed with a burner for generating thermal energy by direct combustion of a fuel, a reformer for practically generating a reformed gas in a reforming reaction between the fuel and steam using the thermal energy, and an evaporator for generating steam by receiving the thermal energy from the burner to evaporate water. Here, the steam refers to vaporized water.

In an existing fuel reforming apparatus, however, the burner, the reformer, and the evaporator are dispersively disposed, and therefore the thermal energy generated by the burner is transferred to the reformer and the evaporator. Accordingly, the burner does not directly exchange the thermal energy with the reformer and the evaporator, and therefore thermal efficiency is decreased.

In addition, in the existing fuel reforming apparatus, the burner, reformer, and the evaporator are customarily dispersed in their positions relative to one another, principally to accommodate operational conveniences, and accordingly the fuel cell system cannot be embodied in a compact size or arrangement.

Furthermore, the existing fuel reforming apparatus can achieve an optimal operational performance only when the thermal energy in the temperature range corresponding to the specific operational temperature is supplied to the reformer and the evaporator. It is difficult to control the thermal energy transferred from the burner to the reformer and the evaporator in order to maximize the thermal efficiency and the operational efficiency of the fuel reforming apparatus.

SUMMARY OF THE INVENTION

It is therefore an object of the present invention to provide an improved fuel cell system.

It is another object of the present invention to provide a fuel reforming apparatus and a fuel cell system incorporating the fuel reforming apparatus, which are embodied as a simple structure, capable of maximizing thermal efficiency and operational efficiency by easily controlling thermal energy needed for operation in addition to improving reaction efficiency and the thermal efficiency.

In an exemplary embodiment of the present invention, there is provided a fuel reforming apparatus constructed with a burner which generates a flame by burning the fuel together with air such as atmospheric air, a reforming reactor which receives thermal energy from the flame and generates the reformed gas through a reforming reaction between the fuel and steam, an evaporator in which a pipeline allowing the fuel and water to flow is disposed in a direction of the flame sprayed from the burner, with the water being evaporated by using the flame and the fuel and the steam being supplied to the reforming reactor, and a spraying unit which is disposed in the direction of the sprayed flame to spray additional air into the evaporator.

The fuel reforming apparatus may use a liquefied gaseous fuel containing butane as a main component as the fuel.

In addition, the evaporator may be constructed with a path member having a shape of a pipeline which is wound in a coiled shape to form an inner space and which is connected to the reforming reactor.

In addition, the air spraying unit may be constructed with a pipeline which curves to conform to the inner space of the path member from the outside of the reforming reactor in order to spray the air in a direction parallel to the direction of the sprayed flame. In the above case, the pipeline may be connected to an air pump. Alternatively, the pipeline may be connected to a non-reacted reformed gas outlet of a fuel cell body.

In another exemplary embodiment of the present invention, there is provided a fuel reforming apparatus constructed with a housing, a reforming apparatus body which is constructed with a first pipe and a second pipe located in the first pipe to be disposed in the housing, a burner which is disposed in the second pipe to generate a flame by burning a fuel together with the air carried by the second pipe, a reforming reactor which is constructed by filling a space between the first and second pipes with a reforming catalyst to generate a reformed gas through a reforming reaction between the gaseous fuel and steam, an evaporator in which a pipeline allowing the gaseous fuel and water to flow is disposed in the direction of the flame sprayed from the burner, with the water being evaporated by the flame, and the gaseous fuel and steam being supplied to the reforming reactor, and an air spray unit which passes through the housing and is disposed in a direction of the sprayed flame to spray additional air into the evaporator.

The reforming reactor may be connected to a fuel cell body in which electrical energy is generated through a reaction between hydrogen and oxygen, and the air spraying unit may be connected to a non-reacted reformed gas outlet of the fuel cell body.

In addition, the burner may be constructed with a torch member which is connected to an end portion of the second pipe to ignite and burn the gaseous fuel together with air.

In addition, the burner may be constructed with a first inlet which is disposed at the torch member in order to inject the gaseous fuel and air into the second pipe, and a nozzle which is disposed at the other end portion of the second pipe to spray a combustion gas and a flame generated when the gaseous fuel and air are burned.

In addition, the reforming reactor may be constructed with a second inlet which is disposed at an end portion of the first pipe in order to inject the gaseous fuel and the steam into the space between the first and second pipes, and an outlet which is disposed at the other end portion of the first pipe in order to discharge the reformed gas.

In addition, the evaporator may be connected to the reforming reactor and disposed at the side of the nozzle of the burner. In the above case, the evaporator is constructed with a path member having a shape of pipeline which is wound in a coiled shape to form an inner space and is connected to the second inlet of the reforming reactor.

In addition, the air spaying unit may include a pipeline which passes through the housing and curves to the inner space of the path member from the outside of the reforming reactor in order to spray the air in a direction parallel to the direction of the sprayed flame.

In still another exemplary embodiment of the present invention, there is provided a fuel cell system constructed with a fuel cell body in which electrical energy is generated through a reaction between hydrogen and oxygen, a fuel reforming apparatus which generates a reformed gas containing the hydrogen through a reforming reaction of a fuel using thermal energy, and supplies the reformed gas to the fuel cell body, a fuel source which supplies the fuel to the fuel reforming apparatus, a water source which supplies water to the fuel reforming apparatus, and an air source which supplies atmospheric or other air to the fuel cell body and the fuel reforming apparatus, with the fuel reforming apparatus being constructed with a burner which generates a flame by burning the fuel together with the air, and an air spraying unit being adapted to spray additional air.

The fuel reforming apparatus may be constructed with a reforming reactor which receives the thermal energy of the flame from the burner and generates the reformed gas through steam reforming reaction between the fuel and steam, and an evaporator in which a pipeline for allowing the fuel and the water to flow is disposed in the direction of the sprayed flame, with the water being evaporated by the heat given by the flame, and the fuel and the steam being supplied to the reforming reactor.

In addition, the evaporator may be constructed with a path member having a shape of a pipeline which is wound in a coiled shape to form an inner space and which is connected to the reforming reactor.

In addition, the air spraying unit may be constructed with a pipeline which curves to conform to the inner space of the path member from the outside of the reforming reactor in order to spray the air in a direction parallel to the direction of the sprayed flame.

In addition, the fuel source may include a fuel tank for storing a liquefied gaseous fuel containing butane as a main component.

In addition, the water source may be constructed with a water tank in which the water is stored, and a liquid pump which is used to discharge the water stored in the water tank.

In addition, the air source may be constructed with an air pump which suctions air and supplies the air to the fuel cell body and to the fuel reforming apparatus, and the air pump may be connected to the air spraying unit.

In addition, the fuel cell body may be constructed with at least one electricity generator which is constructed with a membrane electrode assembly (MEA) and separators disposed on both sides of the MEA.

In addition, the fuel cell body may constructed with a non-reacted reformed gas outlet for discharging the reformed gas which remains after a reaction in the electricity generators. In the above case, the non-reacted reformed gas outlet may be connected to the air spraying unit.

BRIEF DESCRIPTION OF THE DRAWINGS

A more complete appreciation of the present invention and many of the attendant advantage thereof, will be readily apparent as the present invention becomes better understand by reference to the following detailed description when considered in conjunction with the accompanying drawings in which like reference symbols indicate the same or similar components, wherein.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be through and complete, and will fully convey the concept of the invention to those skilled in the art. Wherever possible, the same reference numbers will be used throughout the drawings to refer to the same or like parts.

Figure 1:
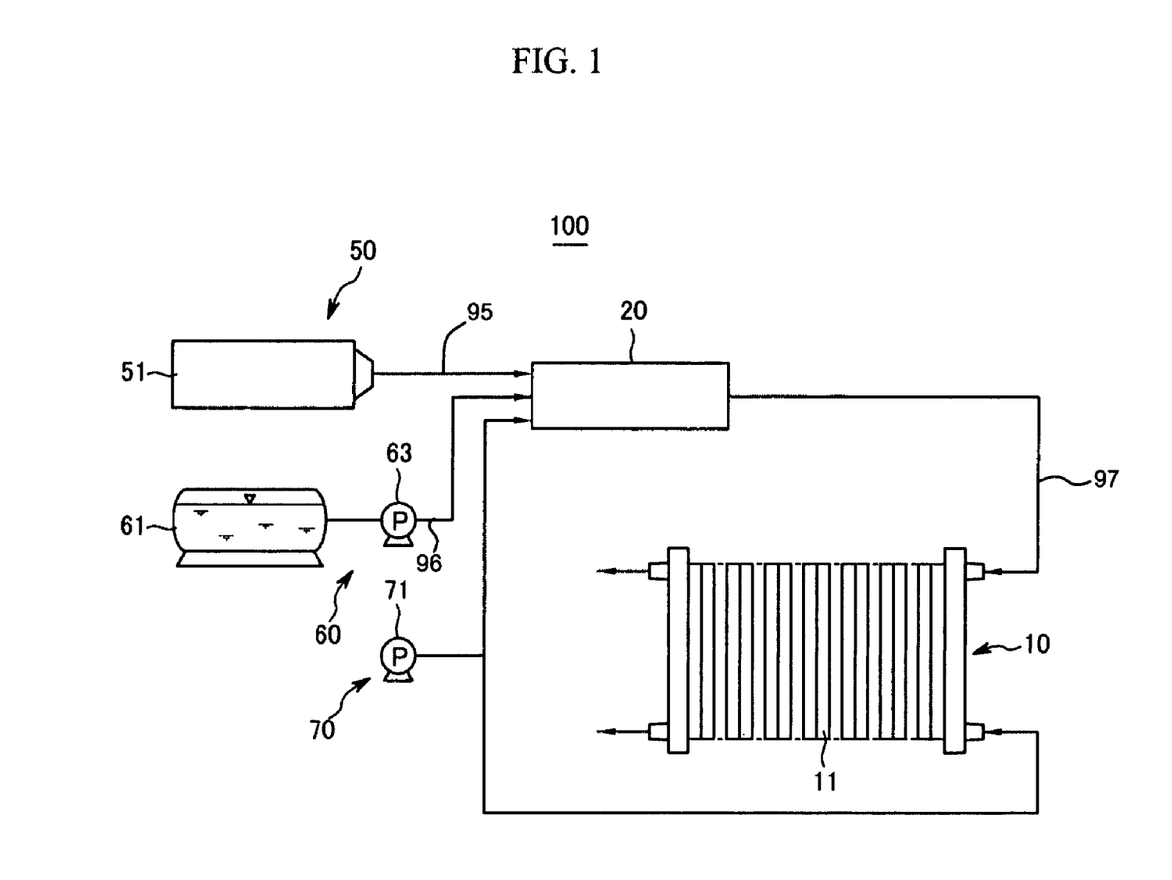
FIG. 1 is a schematic diagram illustrating a fuel cell system constructed as an embodiment according to the principles of the present invention.

FIG. 1 is a schematic diagram illustrating a fuel cell system constructed as an embodiment according to the principles of the present invention.

Referring to FIG. 1, fuel cell system 100 has a structure capable of generating a reformed gas containing hydrogen by reforming a fuel to generate electrical energy through an oxidation reaction of the reformed gas and a reduction reaction of an oxidant gas. For example, fuel cell system 100 may be constructed as a polymer electrode membrane fuel cell (PEMFC).

The fuel used for fuel cell system 100 may contain hydrocarbon based liquid or gaseous fuel such as methanol, ethanol, liquid petroleum gas (LPG), liquid natural gas (LNG). The following fuels, however, refer to the gaseous fuels such as LPG or LNG, for example, a liquefied gaseous fuel containing butane as a main component.

In fuel cell system 100, although oxygen stored in a separate storage unit or the ambient atmospheric air containing oxygen may be used as the oxidant gas, in the present embodiment, the atmospheric air containing oxygen is used.

The aforementioned fuel cell system 100 is constructed with a fuel cell body 10 in which electrical energy is generated through a reaction between hydrogen and oxygen (an oxidation reaction of hydrogen and a reduction reaction of oxygen), a fuel reforming apparatus 20 which generates a reformed gas containing hydrogen by reforming a fuel, a fuel source 50 which supplies the fuel to fuel reforming apparatus 20, a source 60 of water which supplies water to fuel reforming apparatus 20, and an air source 70 which supplies air to fuel cell body 10 and fuel reforming apparatus 20.

In the present embodiment, fuel cell body 10 is connected to fuel reforming apparatus 20 and air source 70, respectively. Fuel cell body 10 is constructed with an electricity generator 11 in each cell, which respectively receives the reformed gas and the air from fuel reforming apparatus 20 and air source 70, and generates electrical energy through an electro-chemical reaction between hydrogen and oxygen. In electric generator 11, electrochemical reactions can be represented as the following formulas.

Anode: $H_2 \rightarrow 2H_+ + 2e$.

Cathode: $\frac{1}{2}O_2 + 2H^+ + 2e^- \rightarrow H_2O$

Total: $H_2 + \frac{1}{2}O_2 \rightarrow H_2O$ + electric current + heat    [Reaction Formula 1]

Practically, fuel cell body 10 is constructed with a plurality of electricity generators 11. Fuel cell body 10 may be constructed as a stack by sequentially coupling together a plurality of electricity generators 11.

Figure 2:
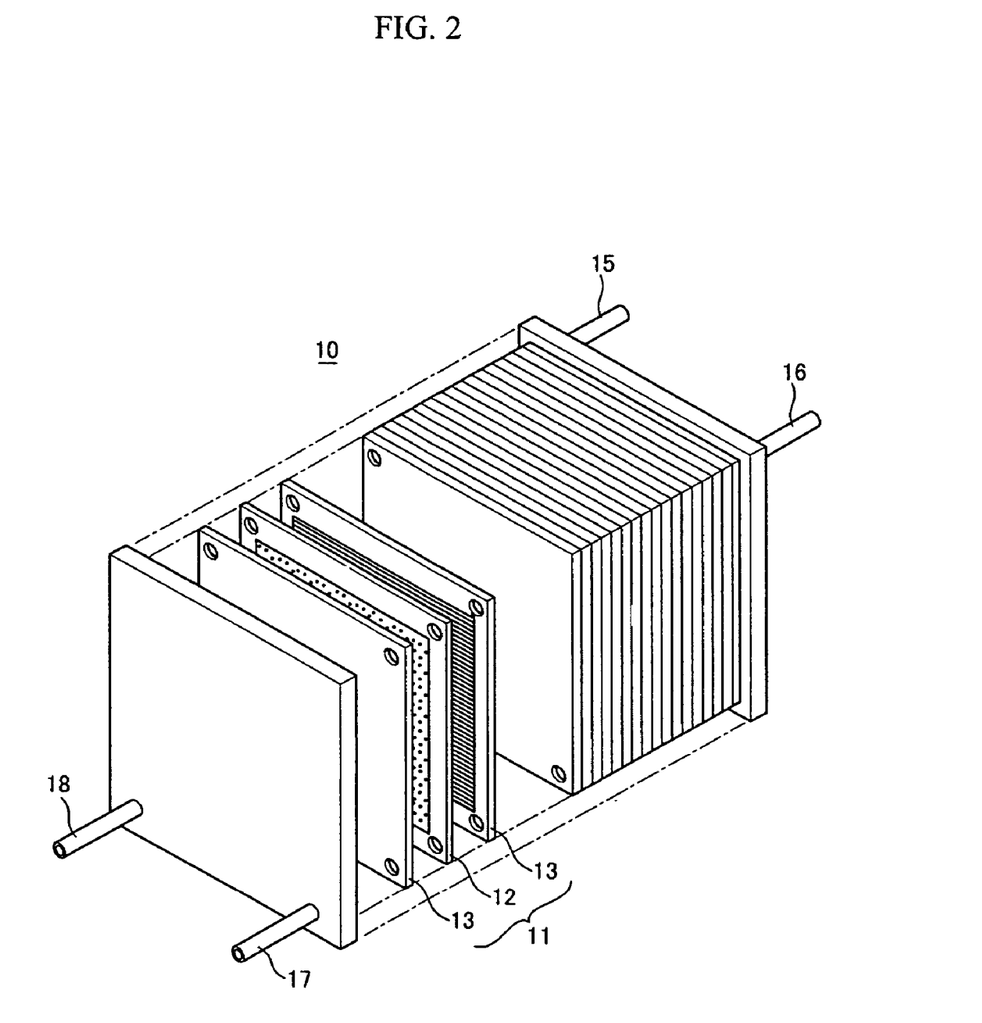
FIG. 2 is an exploded oblique view illustrating a fuel cell body of the fuel cell system shown in FIG. 1.

FIG. 2 is an oblique view illustrating a fuel cell body of the fuel cell system shown in FIG. 1.

Referring to FIG. 2, as described above, fuel cell body 10 as the present embodiment according to the principles of the present invention is constructed as a stack of electricity generators 11. Electricity generator 11 is constructed with a membrane electrode assembly (i.e., MEA) 12 and separators 13 disposed in close contact with both surfaces of MEA 12.

Here, MEA 12 is constructed with anode and cathode electrodes (not shown) disposed on both sides thereof and an electrolyte membrane (not shown) interposed between the electrodes.

In the anode electrode, the hydrogen gas contained in the reformed gas is decomposed into electrons and hydrogen ions. The hydrogen ions move through the electrolyte membrane to the cathode electrode. In the cathode electrode, heat and moisture are generated through a reaction of electrons, hydrogen ions received from the anode electrode, and oxygen in the air.

In addition, separators 13 form channels for supplying the reformed gas to the anode electrode of MEA 12 and supplying the air to the cathode electrode of MEA 12, and function as electrical conductor for serially connecting the anode and cathode electrodes of MEA 12.

Furthermore, fuel cell body 10 as the present embodiment according to the principles of the present invention is constructed with a reformed gas inlet 15 (hereinafter, referred to as "first inlet") for injecting the reformed gas into electricity generators 11, an air inlet 16 (hereinafter, referred to as "second inlet") for injecting the air into electricity generators 11, a non-reacted reformed gas outlet 17 (hereinafter, referred to as "first outlet") for discharging a non-reacted reformed gas which remains after a reaction in electricity generators 11, a steam outlet 18 (hereinafter, referred to as "second outlet") for discharging moisture in steam phase generated in the cathode electrode of MEA 12 together with the non-reacted air which remains after a reaction in electricity generator 11.

In fuel reforming apparatus 20, the fuel and air are burned to generate heat, and the reformed gas containing hydrogen is generated through a steam reforming (SR) reaction between the fuel and the steam using the heat. Exemplary embodiments of fuel reforming apparatus 20 will be further described with reference to FIGS. 3 and 4.

As shown in FIG. 1, fuel source 50 for supplying the fuel to fuel reforming apparatus 20 is constructed with a fuel tank 51 for compressing and storing a liquefied gas fuel such as butane. Fuel tank 51 has a shape of a cylindrical can including an outlet (not shown) for discharging the fuel under the pressure of the gaseous fuel. Fuel tank 51 may be connected to fuel reforming apparatus 20 through a conduit such as a pipe of tube 95.

As shown in FIG. 1, water source 60 for supplying water to fuel reforming apparatus 20 is constructed with a water tank 61 for storing water and a liquid pump 63 connected to water tank 61. Liquid pump 63 is connected to water tank 61 and fuel reforming apparatus 20, respectively, through a conduit 96.

Furthermore, as shown in FIG. 1, air source 70 for supplying air to fuel reforming apparatus 20 and fuel cell body 10 is constructed with a general air pump 71 for suctioning air. Air pump 71 may be connected to second inlet 16 of fuel cell body 10 and fuel reforming apparatus 20, respectively, through a conduit 97.

Figure 3:
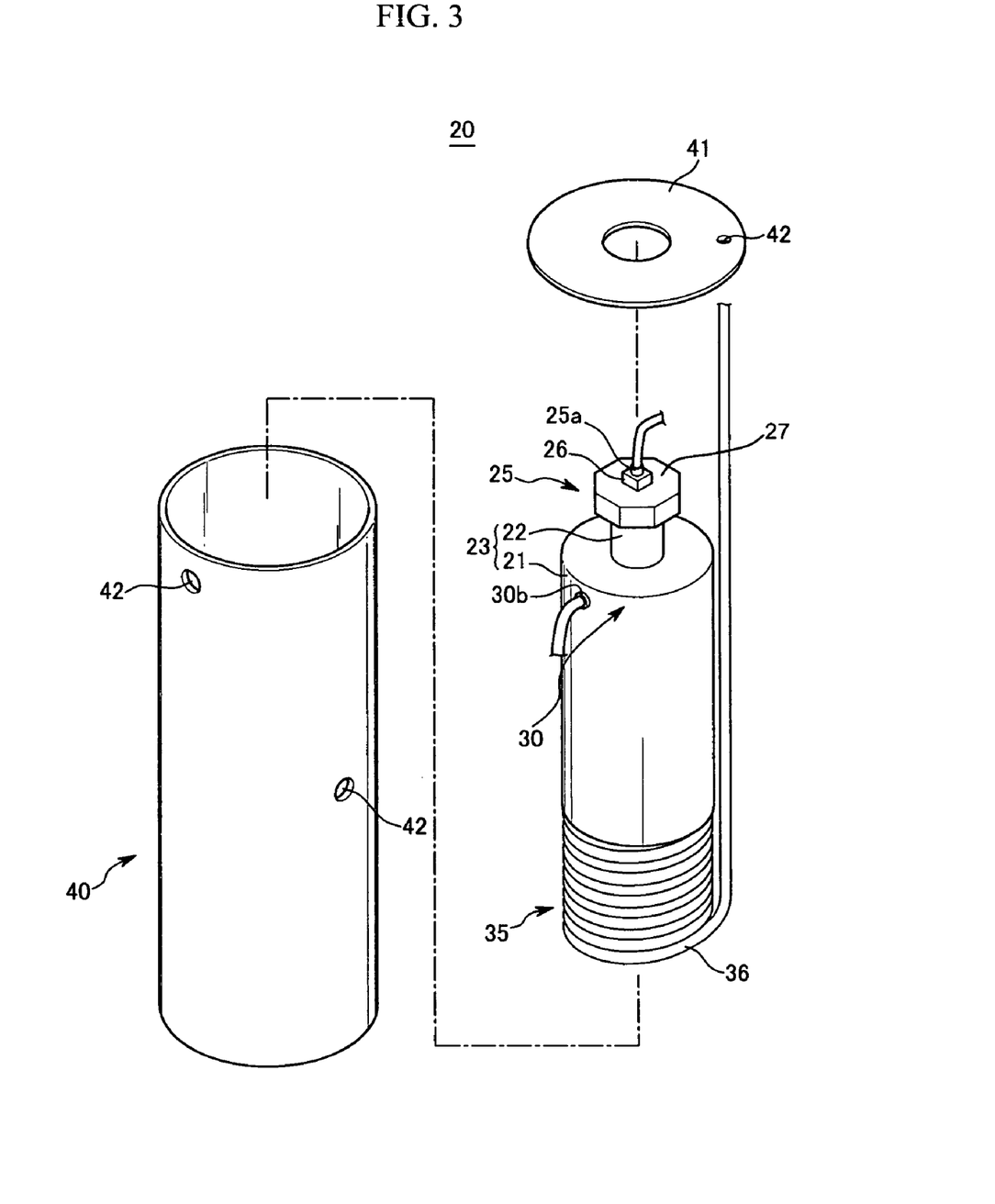
FIG. 3 is an exploded assembly drawing illustrating a fuel reforming apparatus constructed as an embodiment according to the principles of the present invention.
Figure 4:
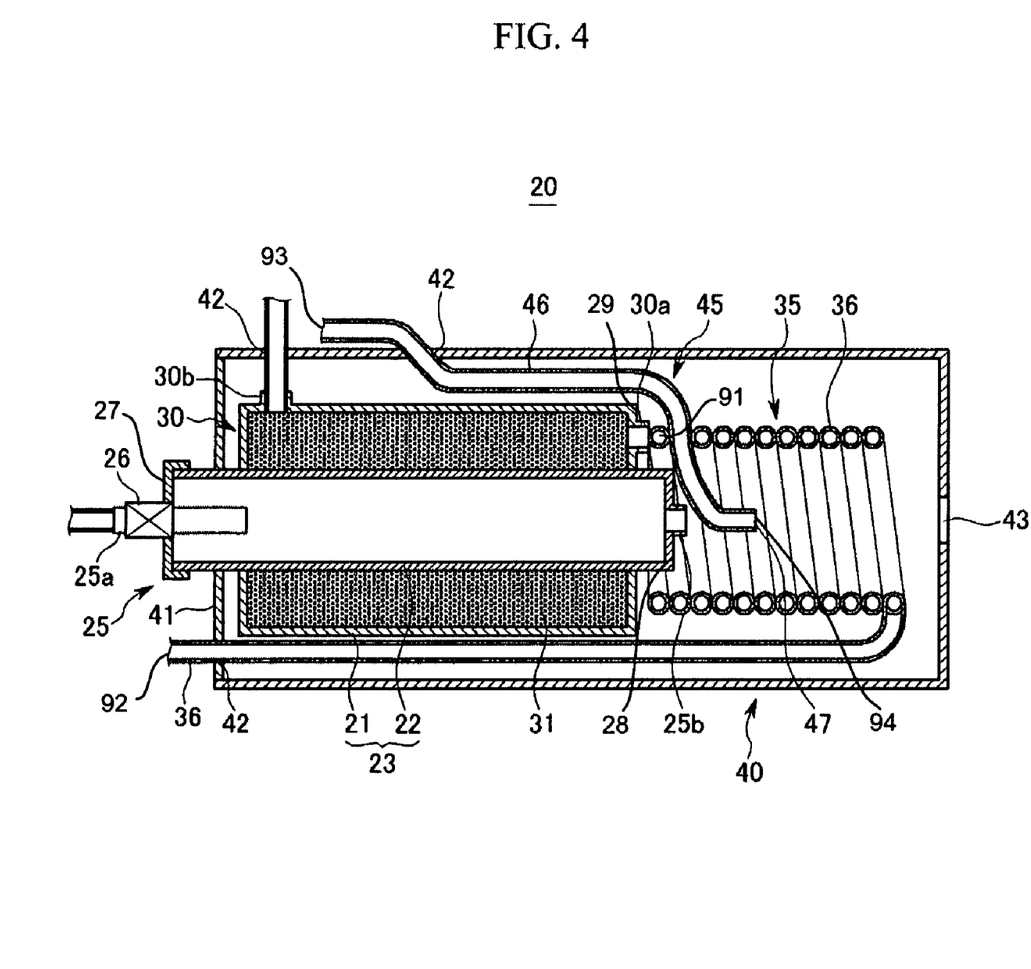
FIG. 4 is a cross sectional view illustrating the fuel reforming apparatus shown FIG. 3.

FIG. 3 is an exploded assembly drawing view illustrating a fuel reforming apparatus as an exemplary embodiment according to the principles of the present invention. FIG. 4 is a cross sectional view illustrating the fuel reforming apparatus shown FIG. 3.

Referring to FIGS. 3 and 4, fuel cell reforming apparatus 20 according to the present embodiment is constructed with a burner 25 for generating a flame by burning a fuel together with air, a reforming reactor 30 for generating a reformed gas containing hydrogen through a reforming reaction between the fuel and steam using thermal energy of the flame, and an evaporator 35 for evaporating water supplied from water source 60 and supplying the steam together with the fuel supplied from fuel source 50 to reforming reactor 30.

Fuel reforming apparatus 20 is further constructed with a reforming apparatus body 23 having a cylindrical shape of a concentric double pipe, including a first pipe 21 and a second pipe 22 possibly coaxially located in first pipe 21.

First pipe 21 has a shape of a cylinder which has a cross sectional area. Second pipe 22 has a shape of cylinder which has a cross sectional area smaller than that of first pipe 21. Second pipe 22 is concentrically disposed in an axial direction (a concentric axial direction) of first pipe 21 so that an outer surface of second pipe 22 is separated by an interval from an inner surface of first pipe 21.

In fuel reforming apparatus 20, burner 25 according to the present embodiment generates a flame by burning the fuel together with air and supplies the thermal energy to reforming reactor 30.

Burner 25 is constructed with a torch member 26 connected to end 27 of second pipe 22. Torch member 26 has a function of igniting and burning the fuel together with the air carried by second pipe 22.

Torch member 26 is constructed with a general igniter plug (not shown) for igniting the fuel and air and a first inlet 25a for injecting the fuel and the air into second pipe 22. First inlet 25a may be complementarily connected to a fuel tank (51 shown in FIG. 1) and an air pump (71 shown in FIG. 1).

In addition, in burner 25, a nozzle 25b for spraying a flame and a combustion gas generated when the fuel and the air are burned in second pipe 22, is formed at the other end 28 of second pipe 22.

In the present embodiment, reforming reactor 30 is used to generate a reformed gas containing hydrogen through a reforming reaction between the additionally supplied fuel and the steam by absorbing the thermal energy supplied from burner 25.

Reforming reactor 30 is constructed by filling the space between first and second pipes 21 and 22 with a reforming catalyst 31. Reforming catalyst 31 may have a structure where a catalytic material such as copper (Cu), nickel (Ni), and platinum (Pt) is contained in a pellet-shaped carrier made from alumina ($Al_2O_3$), silica ($SiO_2$), or titania ($TiO_2$).

In addition, in reforming reactor 30, a second inlet 30a for injecting the gaseous fuel and water into the space between first and second pipes 21 and 22 is formed at an end portion 29 of first pipe 21. Second inlet 30a may be connected to evaporator 35 to be described in the following description.

In reforming reactor 30, an outlet 30b for discharging the reformed gas generated through the reforming reaction between the fuel and the steam using reforming catalyst 31 in the space between first and second pipes 21 and 22 is formed at the other end of first pipe 21.

Outlet 30b may be connected to first inlet 15 of fuel cell body 10 through a general pipe line.

In the present embodiment, evaporator 35 is connected to reforming reactor 30 and disposed at the side of nozzle 25b of burner 25. Evaporator 35 is constructed with a pipeline for allowing the fuel and the water to flow. Evaporator 35 has a function of evaporating the water that flows along the pipeline (path) by using the flame sprayed from nozzle 25b and supplying the fuel together with the steam to reforming reactor 30.

Evaporator 35 is constructed with a path member 36 for forming the pipeline. Path member 36 has a shape of pipeline connected to second inlet 30a of reforming reactor 30. Path member 36 may be made from a general metal such as aluminum, copper, iron.

Specifically, path member 36 according to the present embodiment is wound in a shape of a coil to form an inner space. The fuel and the water flowing along the pipeline of path member 36 form a helical path.

As described above, end 91 of path member 36 is connected to second inlet 30a of reforming reactor 30, and the other end 92 is connected to outside of a housing 40 through housing 40 to be described in the following. The other end 92 of path member 36 may be complementarily connected to fuel tank 51 and liquid pump 63 of water source 60.

Path member 36 are wound in the coiled shape so that a contact area between path member 36 and the flame sprayed through nozzle 25b of burner 25 is maximized and the path through which the fuel and the water flow is elongated.

On the other hand, fuel reforming apparatus 20 is constructed with housing 40 for enclosing reforming apparatus body 23 and evaporator 35. Housing 40 functions as an insulation case for thermally insulating reforming apparatus body 23 and evaporator 35 by preventing the thermal energy, which is generated from burner 25 and applied to reforming apparatus body 23 and evaporator 35, from being released out of housing 40.

In the present embodiment, housing 40 has a shape of cylinder which has an inner space including reforming apparatus body 23 and evaporator 35, and has open and closed ends.

A sealing cap 41 is connected to the open end of housing 40 to seal the inner space of housing 40. Sealing cap 41 has a shape of an annulus through which end 27 of second pipe 22 passes out of housing 40 when reforming apparatus body 23 and evaporator 23 are included in the closed space of housing 40.

Housing 40 is disposed concentrically around first and second pipes 21 and 22 so that an outer surface of first pipe 21 is separated by an interval from an inner surface of housing 40. Housing 40 has a shape of cylinder which has a cross sectional area larger than that of first pipe 21.

In order to thermally insulate reforming apparatus body 23 and evaporator 35 by preventing the thermal energy, which is applied to reforming apparatus body 23 and evaporator 35, from being released out of housing 40, housing 40 may be made from a thermal insulation material having a low thermal conductivity, for example, a metallic thermal insulation material such as stainless steel, zirconium, and aluminum or a non-metallic thermal insulation materials such as ceramics.

Housing 40 is provided with a plurality of holes 42 through which end 92 of path member 36 and a pipeline connected to outlet 30b of reforming reactor 30 pass and through which an air spraying unit 45 to be described in the following is connected to the outside of housing 40. Furthermore, housing 40 has an opening 43 for discharging a combustion gas In fuel reforming apparatus 20 having the aforementioned structure, burner 25 ignites and burns the fuel together with the air to spray the flame into the inner space of path member 36 through nozzle 25b, thereby supplying the thermal energy to path member 36.

In the above process, since the inner space of path member 36 in the limited closed space of housing 40 is small, oxygen is deficient in the inner space of path member 36 and no flame is generated.

Accordingly, in fuel reforming apparatus 20, the thermal energy transferred to path member 36 is reduced, and therefore, evaporation efficiency of the water in evaporator 35 may be decreased.

Fuel reforming apparatus 20 according to the present embodiment is constructed with air spraying unit 45 for spraying additional air into the inner space of path member 36.

Air spraying unit 45 has a function of generating the flame in the inner space of path member 36 by supplying the additional air into the inner space of path member 36.

In the present embodiment, air spraying unit 45 may be constructed by a metal pipeline 46 which passes through housing 40, connecting the outside of housing 40 to the inner space of path member 36 in the closed space of housing 40.

Specifically, pipeline 46 is constructed as a nozzle pipe which passes through housing 40 and the space between housing 40 and first pipe 21 and curves to the inner space of path member 36 to spray the air in a direction parallel to the spraying direction of the flame sprayed through nozzle 25b of burner 25.

Here, an end 93 of pipeline 46 is connected to air pump 71, and the other end 94 of pipeline 46 is provided with a nozzle orifice 47 for spraying the air.

The other end 94 of pipeline 46 provided with nozzle orifice 47 is constructed as a nozzle which curves to the inner space of path member 36 and is disposed in the direction of the flame sprayed through nozzle 25b of burner 25. That is, the nozzle portion of pipeline 46 is disposed in the inner space of path member 36 so that nozzle orifice 47 is disposed in the inner space of path member 36, concentrically with pipeline 46 of path member 36.

Accordingly, air spraying unit 45 according to the present embodiment sprays the additional air into the inner space of path member 36 through pipeline 46 in a direction parallel to the direction of the flame sprayed through nozzle 25b of burner 25.

If the direction of the air sprayed through nozzle 25b of burner 25 is not parallel with the direction of the sprayed flame, the air flows backward or in whirls due to the flame in the inner space of path member 36, the fuel and the air are not uniformly mixed, and the air disturbs the flame, thereby decreasing combustion efficiency in the inner space of path member 36. Accordingly, to prevent this, the nozzle portion of pipeline 46 is disposed along the direction of the sprayed flame to spray the additional air in a direction parallel to the direction of the sprayed flame.

Figure 5:
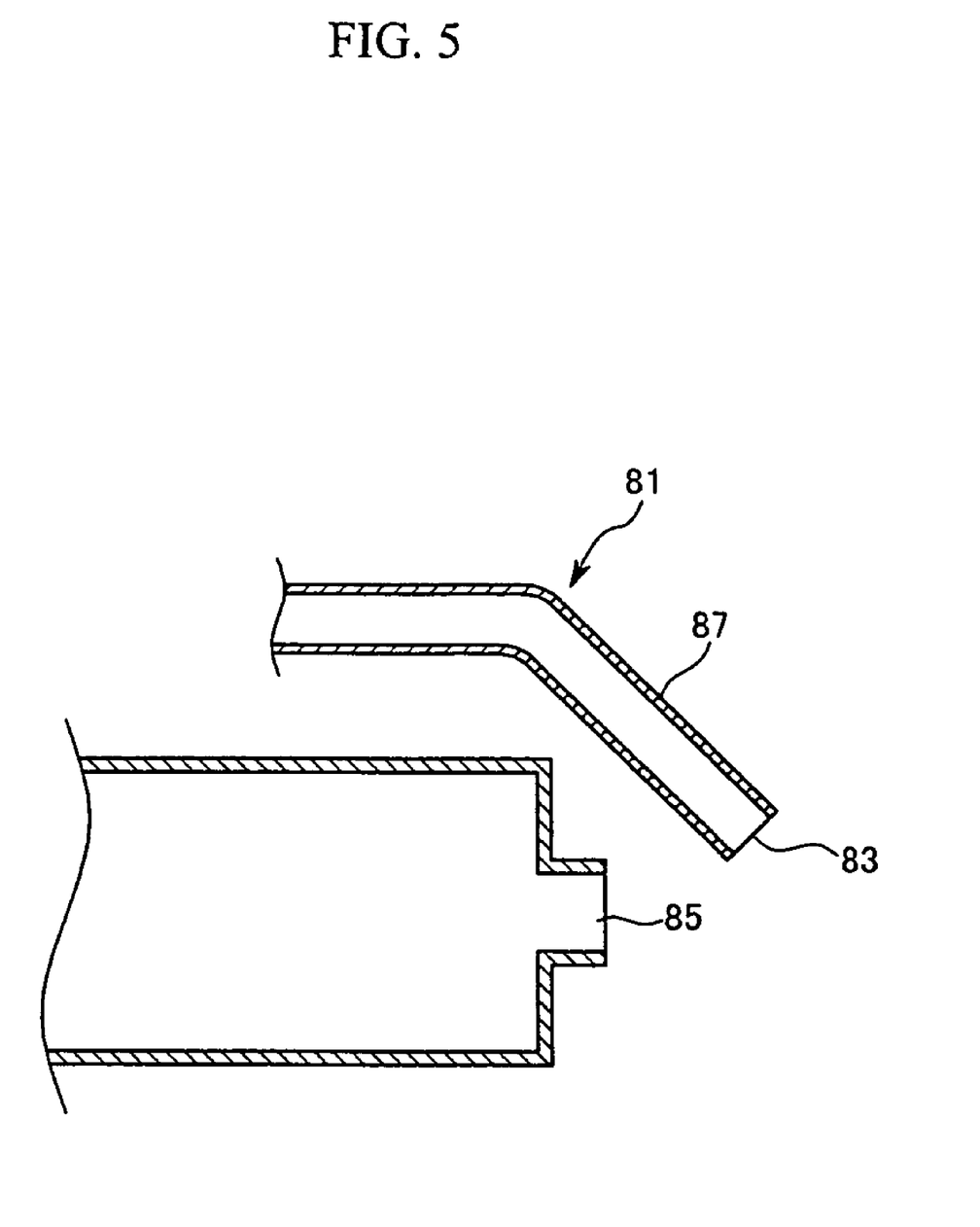
FIG. 5 is a cross sectional view illustrating main parts of a fuel reforming apparatus constructed as another embodiment according to the principles of the present invention.

In an alternative embodiment according to the principles of the present invention, as shown in FIG. 5, in air spraying unit 81, an end of pipeline 87 provided with nozzle orifice 83 is slanted with respect to the direction of the flame sprayed through nozzle 85 of burner 25 so that the air sprayed through nozzle orifice 83 is supplied in the direction that is slanted by an angle with respect to the direction of the flame sprayed through nozzle 85 of burner 25. The slated angle may be an acute angle. In the present embodiment, the slanted angle ranges from 0° to 45°.

The slanted angle of nozzle orifice 83 of pipeline 87 prevents the evaporator or the reforming reactor body from being damaged due to the flame when the flame is generated substantially in the evaporator.

Furthermore, spraying unit 45 according to the present embodiment may be connected to first outlet 17 of fuel cell body 10 shown in FIG. 2. Accordingly, air spraying unit 45 enables the air supplied from air pump 7 and/or the non-reacted reformed gas discharged through first outlet 17 of fuel cell body 10 to be sprayed into the inner space of path member 36.

The operation of fuel cell system 100 constructed as an embodiment of the present invention according to the principles of the present invention will be described in detail in the following.

First, the liquefied gaseous fuel stored in fuel tank 51 is evaporated by absorbing surrounding heat and discharged out of fuel tank 51 to be supplied into second pipe 22 through first inlet 25a of burner 25. At the same time, air pump 71 suctions the air and supplies the air into second pipe 22 through first inlet 25a of burner 25.

Then, when the igniter plug (not shown) of burner 25 operates, in second pipe 22 of burner 25, the fuel and the air are ignited by the igniter plug and burned in second pipe 22, thereby generating the thermal energy.

Since reforming reactor 30 is disposed out of burner 25, the thermal energy is supplied to reforming catalyst 31 of reforming reactor 30 through second pipe 22. Accordingly, reforming catalyst 31 of reforming reactor 30 maintains the preheated state in a temperature range needed for the reforming reaction.

The combustion gas and the flame generated when the fuel and the air are burned in second pipe 22 are sprayed into the inner space of path member 36 through nozzle 25b. Accordingly, path member 36 maintains a heated state in a temperature by receiving the thermal energy of the combustion gas and the fuel.

Air pump 71 supplies the air to pipeline 46 of air spraying unit 45. Since the nozzle portion of pipeline 46 is disposed along the direction of the flame sprayed from nozzle 25b of burner 25 in the inner space of path member 36, the additional air is sprayed in a direction parallel to the direction of the sprayed flame into the inner space of path member 36 through pipeline 46.

Accordingly, the air sprayed into the inner space of path member 36 through pipeline 46 does not flow backward or in whirls and does not disturb the flame to be uniformly mixed with the non-reacted fuel.

Fuel reforming apparatus 20 according to the present embodiment supplies the additional air into the inner space of path member 36 through pipeline 46 to generate the flame in the inner space of path member 36, thereby supplying the additional thermal energy to path member 36.

Path member 36 maintains the heated state in the temperature range in which the water is evaporated by receiving the additional thermal energy.

After the aforementioned processes, the gaseous fuel stored in fuel tank 51 is supplied to path member 36. At the same time, the water stored in water tank 61 is discharged by liquid pump 63 and supplied to path member 36. Since path member 36 are wound in the coiled shape, the fuel and the water flows along path member 36 to form a helical path.

Since path member 36 maintains the heated state in the temperature range, the water, which flows together with the fuel along the pipeline of path member 35, is evaporated.

The steam and the fuel are supplied to the space between first and second pipes 21 and 22 through second inlet 30a of reforming reactor 30. Since in reforming reactor 30, reforming catalyst 31 maintains the preheated state in the temperature range needed for the reforming reaction by using burner 25, the reforming reaction between the fuel and the steam using reforming catalyst 31 is performed to generate the reformed gas containing hydrogen. The reformed gas is discharged through outlet 30b of reforming reactor 30 and supplied to electricity generators 11 through first inlet 15 of fuel cell body 10.

At same time, air pump 71 supplies the atmospheric air to electricity generators 11 through second inlet 16 of fuel cell body 10. In fuel cell body 10, the oxidation reaction of hydrogen and the reduction reaction of oxygen are performed by electricity generators 11 to output the electrical energy.

During the aforementioned processes, reforming reactor 30 and evaporator 35 are thermally insulated by housing 40 made from a thermal insulation material to prevent the thermal energy applied to reforming reactor 30 and evaporator 35 from being released out of housing 40.

On the other hand, the non-reacted reformed gas which remains after a reaction in electricity generators 11 is discharged through first outlet 17 of fuel cell body 10. Since first outlet 17 of fuel cell body 10 is connected to pipeline 46 of air spraying unit 45, the non-reacted reformed gas is supplied to the inner space of path member 36 through pipeline 46 and burned in the inner space of path member 36, thereby supplying the additional thermal energy to path member 36.

As described above, according to an embodiment of the principles of the present invention, the fuel reforming apparatus capable of rapidly transferring the thermal energy generated by the burner to the reforming reactor and the evaporator is constructed as a simple structure, and therefore, it is possible to improve thermal efficiency and operational performance of the fuel reforming apparatus and to realize a compact fuel cell system.

In addition, according to an embodiment of the principles of the present invention, the fuel reforming apparatus capable of spraying the additional air for generating the flame in the inner space of the path member in a direction parallel to the direction of the sprayed flame, and therefore, it is possible to improve the evaporation efficiency of the evaporator, the thermal efficiency and performance of the fuel reforming apparatus.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell system, comprising:
   a fuel cell body in which electrical energy is generated through a reaction between hydrogen and oxygen;
   a fuel reforming apparatus which generates a reformed gas containing the hydrogen through a reforming reaction of a fuel using thermal energy and supplies the reformed gas to the fuel cell body;
   a fuel source which supplies the fuel to the fuel reforming apparatus;
   a water source which supplies water to the fuel reforming apparatus; and
   an air source which supplies air to the fuel cell body and the fuel reforming apparatus,
   with the fuel reforming apparatus is comprising:
      a burner generating a flame and spraying the flame by burning the fuel together with the air;
      an air spraying unit adapted to spray additional air;
      a reforming reactor receiving the thermal energy from the flame of the burner and generating the reformed gas through a steam reforming reaction between the fuel and steam; and
      an evaporator comprising a pipeline allowing the fuel and the water to flow and disposed in the direction of the flame sprayed from the burner, the water being evaporated by the flame to generate the steam, and the fuel and the steam being supplied to the reforming reactor.

2. The fuel cell system of claim 1, comprised of the evaporator being constructed with a path member having a shape of a pipeline which is wound in a coiled shape to form an inner space and connected to the reforming reactor.

3. The fuel cell system of claim 2, comprised of the air spraying unit being constructed with a pipeline which curves to the inner space of the path member from the outside of the reforming reactor in order to spray the air in a direction parallel to the direction of the flame sprayed from the burner.

4. The fuel cell system of claim 2, comprised of the air spraying unit being constructed with a pipeline which passes through a housing of the fuel reforming apparatus and curves to the inner space of the path member from the outside of the reforming reactor in order to spray the air in the direction slanted by an acute angle with respect to the direction of the flame sprayed from the burner.

5. The fuel cell system of claim 1, comprised of the fuel source being constructed with a fuel tank for storing a liquefied gaseous fuel containing butane as a main component.

6. The fuel cell system of claim 1, comprised of the water source comprising:
   a water tank in which the water is stored; and
   a liquid pump which is used to discharge the water stored in the water tank.

7. The fuel cell system of claim 1, comprising:
   the air source being constructed with an air pump which suctions air and supplies the air to the fuel cell body and the fuel reforming apparatus, and
   the air pump being connected to the air spraying unit.

8. The fuel cell system of claim 1, comprised of the fuel cell body being constructed with at least one electricity generator which is constructed with an MEA (membrane electrode assembly) and separators disposed on both sides of the MEA.

9. The fuel cell system of claim 8, comprised of the fuel cell body being constructed with a non-reacted reformed gas outlet for discharging the reformed gas which remains after a reaction in the electricity generators.

10. The fuel cell system of claim 9, comprised of the non-reacted reformed gas outlet is connected to the air spraying unit.

* * * * *